United States Patent
Imaoka et al.

(10) Patent No.: US 10,273,922 B2
(45) Date of Patent: Apr. 30, 2019

(54) CONTROL METHOD AND CONTROL DEVICE OF DIRECT INJECTION INTERNAL COMBUSTION ENGINE

(71) Applicant: NISSAN MOTOR CO., LTD., Yokohama-shi, Kanagawa (JP)

(72) Inventors: Yoshihiro Imaoka, Kanagawa (JP); Takao Inoue, Kanagawa (JP); Takeshi Tsuyuki, Kanagawa (JP)

(73) Assignee: NISSAN MOTOR CO., LTD., Yokohama-shi, Kanagawa (JP)

( * ) Notice: Subject to any disclaimer, the term of this patent is extended or adjusted under 35 U.S.C. 154(b) by 0 days.

(21) Appl. No.: 16/074,489

(22) PCT Filed: Feb. 12, 2016

(86) PCT No.: PCT/JP2016/054128
§ 371 (c)(1),
(2) Date: Aug. 1, 2018

(87) PCT Pub. No.: WO2017/138144
PCT Pub. Date: Aug. 17, 2017

(65) Prior Publication Data
US 2019/0040830 A1    Feb. 7, 2019

(51) Int. Cl.
| | | |
|---|---|---|
| *F02M 61/18* | (2006.01) | |
| *F01P 3/16* | (2006.01) | |
| *F02M 53/04* | (2006.01) | |
| *F01P 7/16* | (2006.01) | |
| *F02D 41/38* | (2006.01) | |

(Continued)

(52) U.S. Cl.
CPC ............ *F02M 61/1806* (2013.01); *F01P 3/16* (2013.01); *F01P 7/16* (2013.01); *F02D 41/3845* (2013.01); *F02F 1/10* (2013.01); *F02F 1/36* (2013.01); *F02M 53/043* (2013.01); *F01P 2003/027* (2013.01); *F01P 2025/33* (2013.01); *F01P 2025/46* (2013.01); *F02B 2075/125* (2013.01);
(Continued)

(58) Field of Classification Search
CPC ............ F02M 61/1806; F02M 53/043; F02M 2700/077; F01P 3/16; F01P 7/16; F01P 2003/027; F01P 2025/33; F01P 2025/46; F02D 41/3845; F02D 2041/389; F02F 1/10; F02F 1/36; F02B 2075/125
USPC ....................................................... 123/446
See application file for complete search history.

(56) References Cited

U.S. PATENT DOCUMENTS

| | | |
|---|---|---|
| 5,709,190 A | 1/1998 | Suzuki |
| 5,724,927 A | 3/1998 | Suzuki |

(Continued)

FOREIGN PATENT DOCUMENTS

| | | |
|---|---|---|
| JP | H05-214946 A | 8/1993 |
| JP | H08-296463 A | 11/1996 |

(Continued)

*Primary Examiner* — Mahmoud Gimie
(74) *Attorney, Agent, or Firm* — Drinker Biddle & Reath LLP

(57) ABSTRACT

An object of a control method to control a direct injection internal combustion engine that directly injects fuel in a cylinder is to reduce an increase in PN caused by attachment of the fuel to a fuel injection valve distal end. The control method cools the fuel before a fuel temperature when the fuel passes through an injection hole on a fuel injection valve reaches a temperature at which an amount of attached fuel to the fuel injection valve distal end increases.

2 Claims, 15 Drawing Sheets

(51) Int. Cl.
*F02F 1/10* (2006.01)
*F02F 1/36* (2006.01)
*F02B 75/12* (2006.01)
*F01P 3/02* (2006.01)

(52) U.S. Cl.
CPC . *F02D 2041/389* (2013.01); *F02M 2700/077* (2013.01)

(56) References Cited

U.S. PATENT DOCUMENTS

| | | | | |
|---|---|---|---|---|
| 5,970,949 | A * | 10/1999 | Iwade | F01P 7/167 123/295 |
| 5,983,843 | A * | 11/1999 | Suzuki | F01P 3/16 123/302 |
| 2009/0133668 | A1 | 5/2009 | Ashizawa | |
| 2012/0012073 | A1* | 1/2012 | Brewer | F01N 13/105 123/41.74 |
| 2017/0030286 | A1* | 2/2017 | Imaoka | F01P 3/02 |

FOREIGN PATENT DOCUMENTS

| | | | |
|---|---|---|---|
| JP | H09-14103 | A | 1/1997 |
| JP | H09-256926 | A | 9/1997 |
| JP | H11-22591 | A | 1/1999 |
| JP | 2002-98022 | A | 4/2002 |
| JP | 2008-38814 | A | 2/2008 |
| JP | 2012-197706 | A | 10/2012 |

\* cited by examiner

Combustion chamber

CONTROL METHOD AND CONTROL DEVICE OF DIRECT INJECTION INTERNAL COMBUSTION ENGINE

TECHNICAL FIELD

The present invention relates to a control of direct injection internal combustion engine that directly injects fuel in a cylinder.

BACKGROUND ART

JPH9-256926A discloses a technique that cools a fuel injection valve using coolant at a temperature lower than engine coolant as a control of a direct injection internal combustion engine. This technique actively cools fuel to prevent a phenomenon caused by a temperature rise of the fuel injection valve such as an actuation failure and a variation of an amount of injection of the fuel injection valve for stable fuel injection.

SUMMARY OF INVENTION

Nowadays, from an aspect of an environmental problem, discharged gas regulations have been strict. The number of microparticles contained in discharged gas (Particulate matter: hereinafter referred to as PM), so-called Particulate Number (PN), is also subject to the regulation. In view of this, various studies and developments have been conducted to lower the PN. The inventors have found out through the studies that a rise of a fuel temperature when the fuel passes through an injection hole on a fuel injection valve increases an amount of liquid fuel attached to a peripheral area of the injection hole and combustion of this liquid fuel increases the PN.

The Literature solely aims to stabilize the fuel injection and does not mention a reduction in increase of PN at all. It has been apparent that a fuel temperature at which the amount of liquid fuel attached to the peripheral area of the above-described injection hole increases is lower than a temperature at which a failure such as the actuation failure of the fuel injection valve occurs.

That is, the technique disclosed in the Literature possibly fails to reduce the increase in PN.

An object of the present invention is to reduce the increase in PN in a direct injection internal combustion engine.

According to an aspect of this invention, there is provided a control method of direct injection internal combustion engine that directly injects fuel in a cylinder. The control method cools the fuel before a fuel temperature when the fuel passes through an injection hole on a fuel injection valve reaches a temperature at which an amount of attached fuel to the fuel injection valve distal end increases.

DESCRIPTION OF EMBODIMENTS

The following describes embodiments of the present invention with reference to the attached drawings.

First Embodiment

Figure 1:
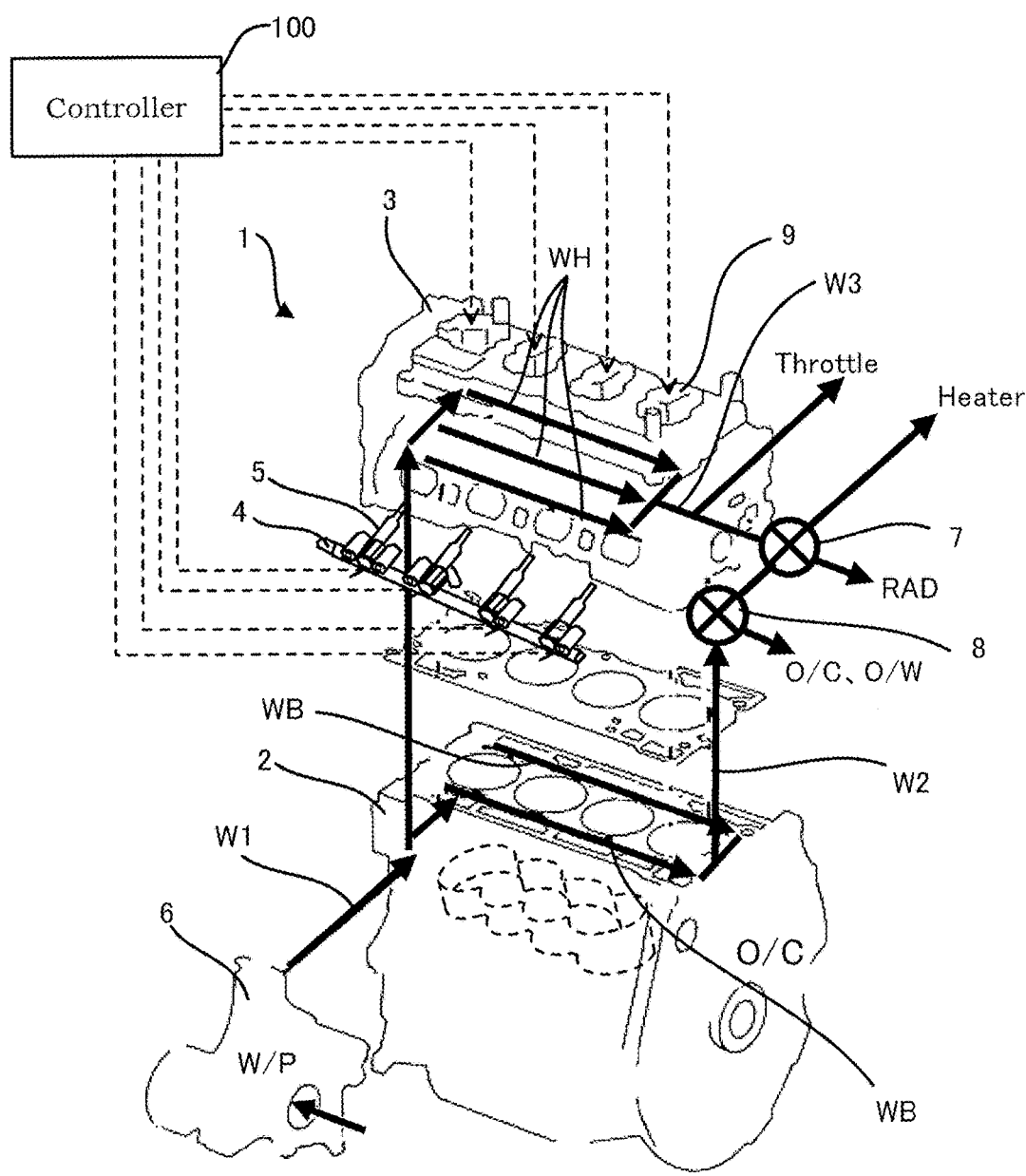
FIG. 1 is a schematic configuration diagram of coolant passages according to a first embodiment.
Figure 2:
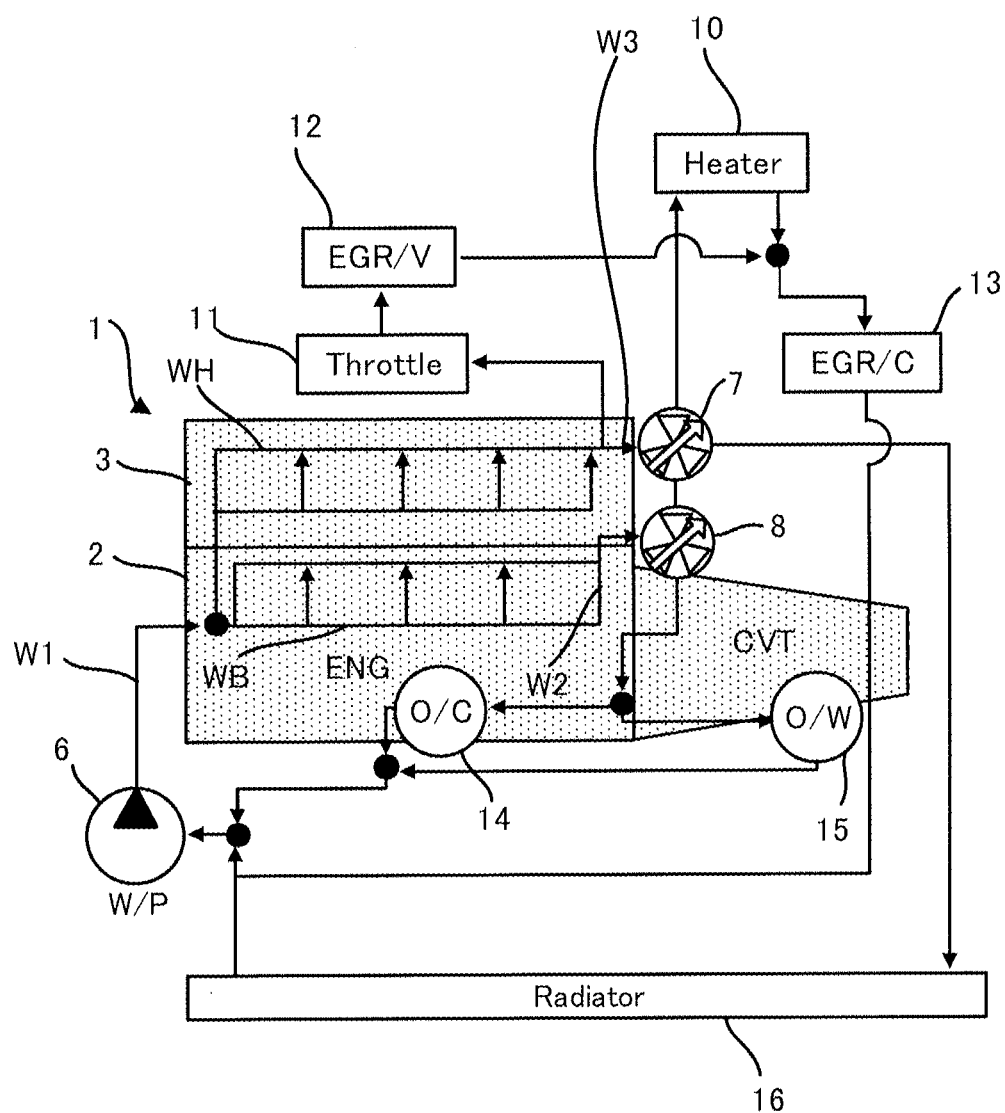
FIG. 2 is a circuit diagram of the coolant passages in FIG. 1.
Figure 3:
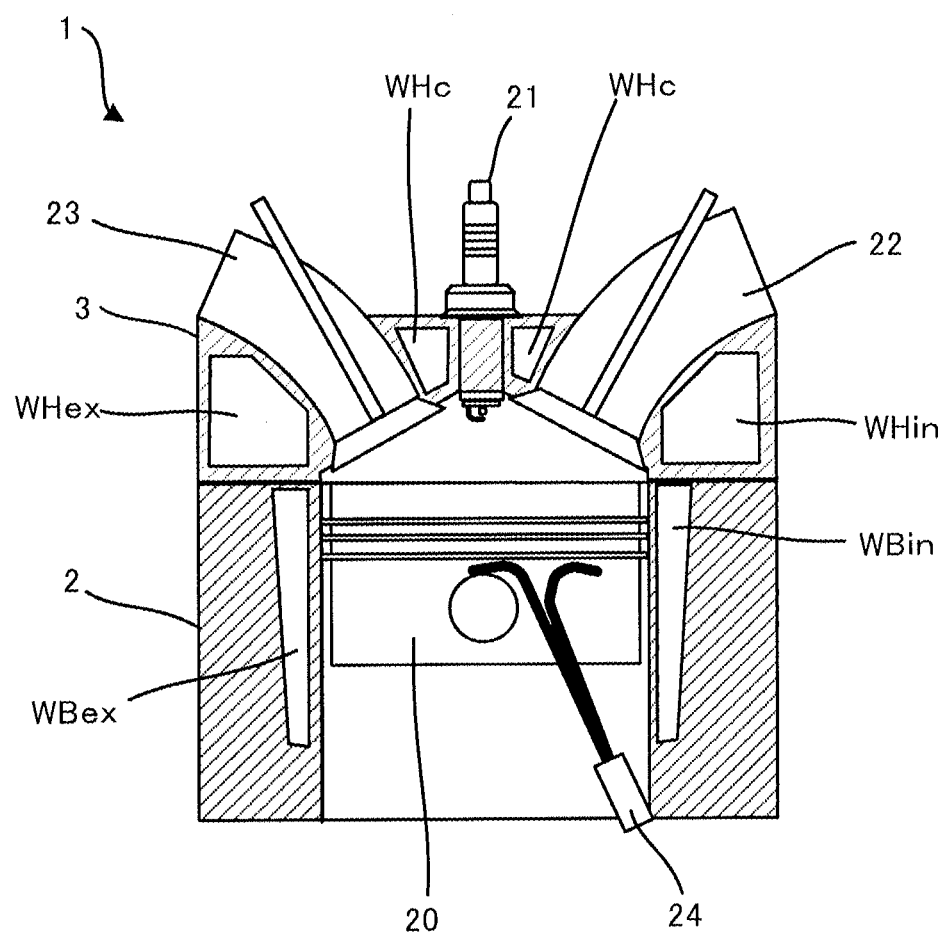
FIG. 3 is a cross-sectional view of one cylinder in an internal combustion engine.

FIG. 1 is a schematic configuration diagram of coolant passages according to the first embodiment. FIG. 2 is a drawing illustrating the coolant passages in FIG. 1 by a circuit diagram. FIG. 3 is a cross-sectional view of one cylinder. It should be noted that FIG. 2 and FIG. 3 omit a fuel injection device described later.

An internal combustion engine 1 includes the so-called common-rail fuel injection device that injects fuel accumulated in a common-rail 4 in a high pressure state from injectors 5. A controller 100 performs controls of the injectors 5 such as a fuel injection timing and an amount of fuel injection. The controller 100 controls an ignition timing of an ignition plug 9 in addition to the above-described controls.

The injector 5 is a cylinder direct injection internal combustion engine that directly injects gasoline as the fuel to an inside of a cylinder to combust air-fuel mixture by spark ignition by an ignition plug 21.

A coolant passage of the internal combustion engine 1 is constituted including block-side passages WB, which are disposed on a cylinder block 2 along a cylinder row, and head-side passages WH, which are disposed on a cylinder head 3 along the cylinder row. The block-side passages WB and the head-side passages WH are independent of one another.

As illustrated in FIG. 3, the block-side passages WB are constituted of an air-intake-side passage WBin and an exhaust-air-side passage WBex. The air-intake-side passage WBin and the exhaust-air-side passage WBex are joined together at a downstream in a coolant flowing direction and become a block outlet passage W2. The block outlet passage W2 is coupled to a second flow passage control valve (a Multiflow Control Valve: MCV) 8.

As illustrated in FIG. 3, the head-side passage WH is constituted of an air-intake-side passage WHin, which is disposed between an intake port 22 and a cylinder head sidewall, an exhaust-air-side passage WHex, which is disposed between an exhaust port 23 and the cylinder head sidewall, and center passages WHc, which are disposed between the intake port 22 and the exhaust port 23. The air-intake-side passage WHin, the exhaust-air-side passage WHex, and the center passages WHc join together at the downstream in the coolant flowing direction and become a head outlet passage W3. The head outlet passage W3 branches again. One side is coupled to a first flow passage control valve (MCV) 7, and the other side is coupled to a throttle valve 11 described later.

To the first MCV 7, a passage to the second MCV 8, a passage to a radiator 16, and a passage to a heater core 10 are coupled. The first MCV 7 has a function that switches a passage to a passage any one of the passages through which the coolant flows. Additionally, the first MCV 7 can cut off the flow of coolant.

To the second MCV 8, a passage to the first MCV 7 and a passage to an oil cooler 14 and an oil warmer 15 are coupled. The second MCV 8 also has a function similar to the first MCV 7.

As illustrated in FIG. 2, the coolant passage from the first MCV 7 heading for the heater core 10 is coupled from the heater core 10 to a water pump 6 via an EGR cooler (EGR/C) 13. As illustrated in FIG. 2, the coolant passage from the first MCV 7 heading for the radiator 16 is coupled to the water pump 6 via the radiator 16.

The coolant passage from the second MCV 8 heading for the oil cooler 14 and the oil warmer 15 branches to a passage heading for the oil cooler 14 disposed in the internal combustion engine 1 and a passage heading for a transmission (CVT in the drawing). The passages join together after passing through the oil cooler 14 and the oil warmer 15, and the joined passage is coupled to the water pump 6.

The coolant passage branched from the head outlet passage W3 heading for the throttle valve 11 joins to a passage coupling the heater core 10 and the EGR cooler 13 via the throttle valve 11 and an EGR valve (EGR/V) 12.

Since the above-described cooling circuit includes the independent coolant passages, the block-side passages WB and the head-side passages WH, inside the internal combustion engine 1, a temperature of the cylinder block 2 and a temperature of the cylinder head 3 can be independently controlled.

Next, the following describes an increase in PN caused by the fuel attached to a distal end of the injector 5, which is a problem solved by this embodiment.

Figure 4:
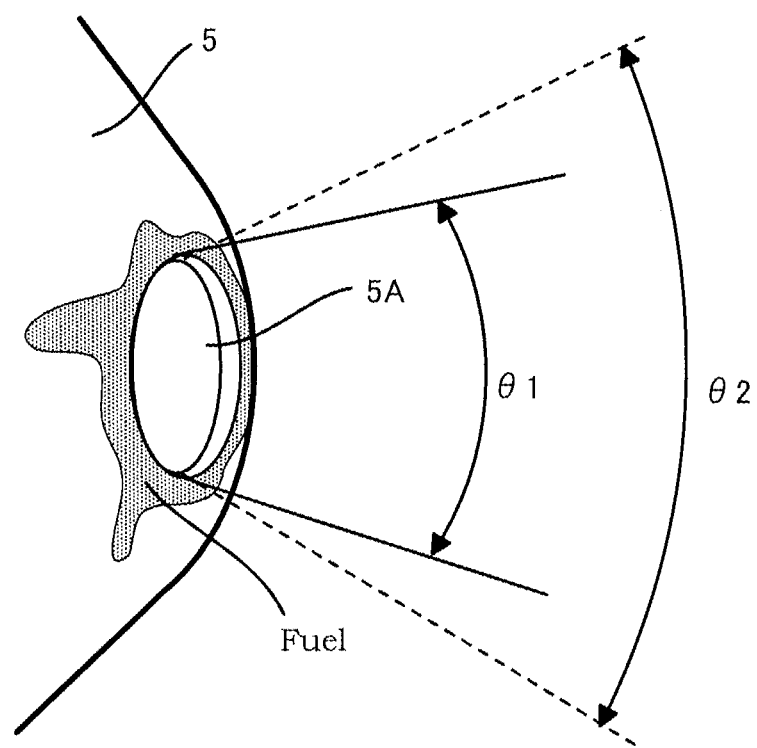
FIG. 4 is an enlarged view of an injector distal end portion.

FIG. 4 is an enlarged view near the distal end of the injector 5. For simplification, this drawing illustrates the case of one injection hole 5A.

Since the fuel is injected from the high-pressure common-rail 4 to the inside of the tube, flash boiling is likely to occur at a high fuel temperature. Causing the flash boiling increases an angle of spray of fuel spray injected from the injection hole 5A. For example, denoting the angle of spray with the fuel temperature when the fuel passes through the injection hole 5A at a normal temperature (around 25° C.) by θ1 and denoting the angle of spray with the high fuel temperature (around 90° C.) by θ2, θ1<θ2 is met. As the angle of spray increases, the fuel is likely to attach to the peripheral area of the injection hole 5A. That is, as the fuel temperature rises, the fuel is likely to attach to the peripheral area of the injection hole 5A (namely, the distal end of the injector 5).

It should be noted that although even the fuel at the normal temperature possibly attaches to the peripheral area of the injection hole 5A, the amount is extremely trace and therefore the attached fuel does not affect the PN. This embodiment designates the attachment of the fuel to the distal end of the injectors 5 to the extent of involving the increase in PN as "a distal end wet" (chip wet). The increase in amount of attached fuel is referred to as "an increase in wet amount."

Figure 5:
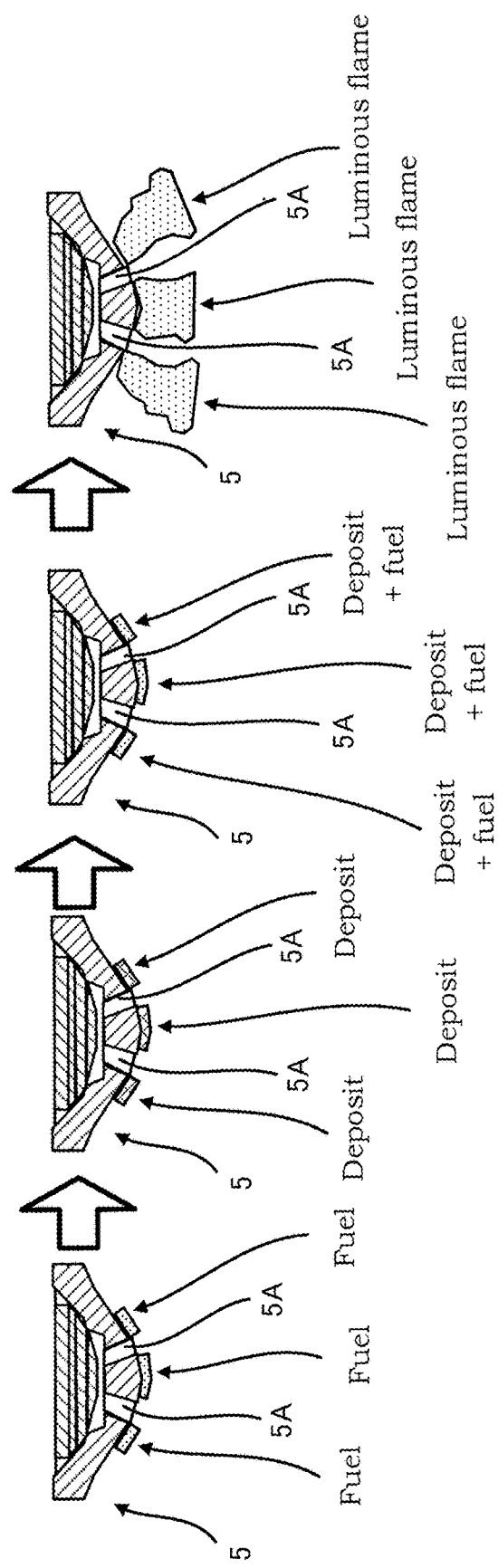
FIG. 5 is a drawing to describe a mechanism of a PN increase.

FIG. 5 is a drawing to describe a mechanism of the PN increase caused by the increase in wet amount. FIG. 5 illustrates the case of the two injection holes 5A.

If the fuel becomes a high temperature and the flash boiling occurs, the distal end wet occurs. Especially, with the plurality of injection holes 5A, the increase in angle of spray due to the rise of the fuel temperature integrates the fuel sprays injected from the adjacent injection holes 5A, resulting in further increases in wet amount.

A reaction of the liquid fuel attached to the distal end of the injector 5 with combustion gas generates a so-called deposit. If a situation in which the distal end wet repeatedly occurs is present, the fuel is absorbed into the deposit. When the fuel thus absorbed into the deposit ignites through the rise of the injector distal end temperature, a propagation of a burnt flame, or a similar cause, the fuel generates a luminous flame and combust, involving the increase in PN.

Therefore, this embodiment performs the control described below to reduce the distal end wet.

Figure 6:
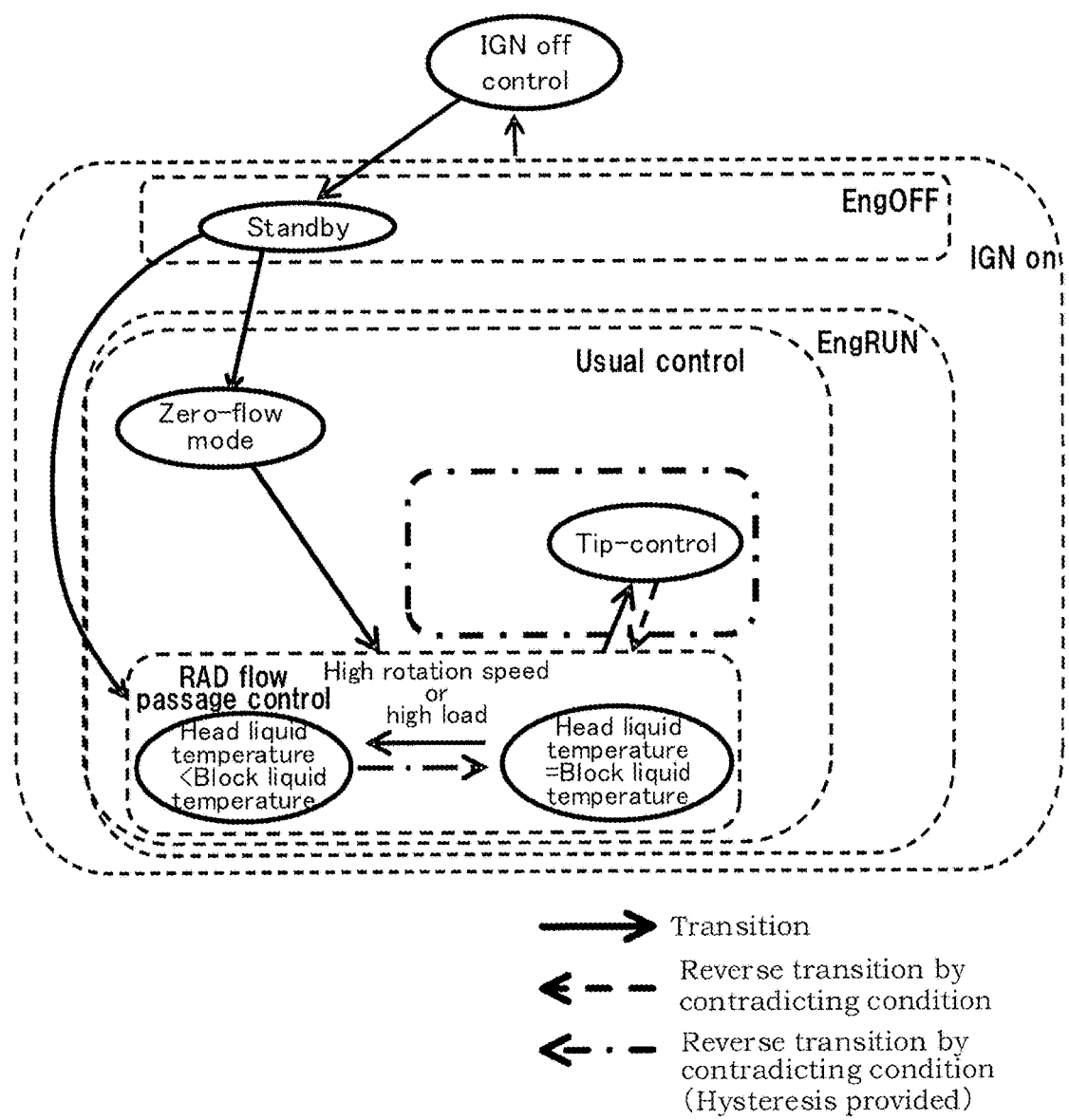
FIG. 6 is an engine operating state transition drawing of the internal combustion engine.

FIG. 6 is a drawing to describe a transition of an engine operating mode assuming the control of this embodiment.

To start the operation, first the engine operating mode transitions from an IGN off control mode to a Standby mode and then transitions to a Zero-Flow mode (the Zero-Flow mode in the drawing) or a radiator flow passage control (a RAD flow passage control in the drawing) mode according to the coolant temperature, an external temperature, or a similar temperature.

The Zero-Flow mode is a mode to accelerate a rise of an oil water temperature of the internal combustion engine 1 at a cold starting. Specifically, closing the first MCV 7 and the second MCV 8 cuts off the flow of the coolant to retain the coolant inside the internal combustion engine 1 and accelerate the temperature rise of the coolant. Cutting off the flow of the coolant also retains the coolant in the oil cooler 14, thereby accelerating a temperature rise of engine oil as well. It should be noted that the first MCV 7 and the second MCV 8 are opened before the coolant boils.

The Zero-Flow mode ends when a heater switch turns ON and the state enters a warm-up state. Alternatively, even if these conditions are not met, the Zero-Flow mode ends at an elapse of a predetermined period (for example, a few minutes) from the start of the Zero-Flow mode. At the end of the Zero-Flow mode, the mode transitions to the radiator flow passage control mode.

Similar to the general flow passage control, the radiator flow passage control mode circulates the coolant with a route bypassing the radiator 16 with the coolant temperature of equal to or less than the predetermined temperature and circulates the coolant with a route passing through the radiator 16 with the coolant temperature in excess of the predetermined temperature. Note that, the internal combustion engine 1 of this embodiment can independently control the respective temperature of the cylinder block 2 and temperature of the cylinder head 3 as described above. The radiator flow passage control mode is additionally divided into two modes. The one (a first mode) is a mode that controls the cylinder block and the cylinder head to an identical temperature, and the other (a second mode) is a mode that controls the cylinder head to a temperature lower than the cylinder block. In the case where a load becomes higher than a predetermined load or an engine revolution speed becomes higher than a predetermined rotation speed, the second mode is performed and the first mode is performed in other cases. It should be noted that, to reduce a complicated control, hystereses may be provided to a predetermined load and a predetermined rotation speed to determine whether the first mode transitions to the second mode or not and a predetermined load and a predetermined rotation speed to determine whether the second mode transitions to the first mode or not. The coolant temperatures inside the head-side passages WH and the coolant temperatures inside the block-side passages WB in the first mode and the second mode will be described later.

When the fuel temperature rises during the execution of the radiator flow passage control mode, to reduce the distal end wet, the mode transitions to a fuel temperature control mode described later.

Figure 7:
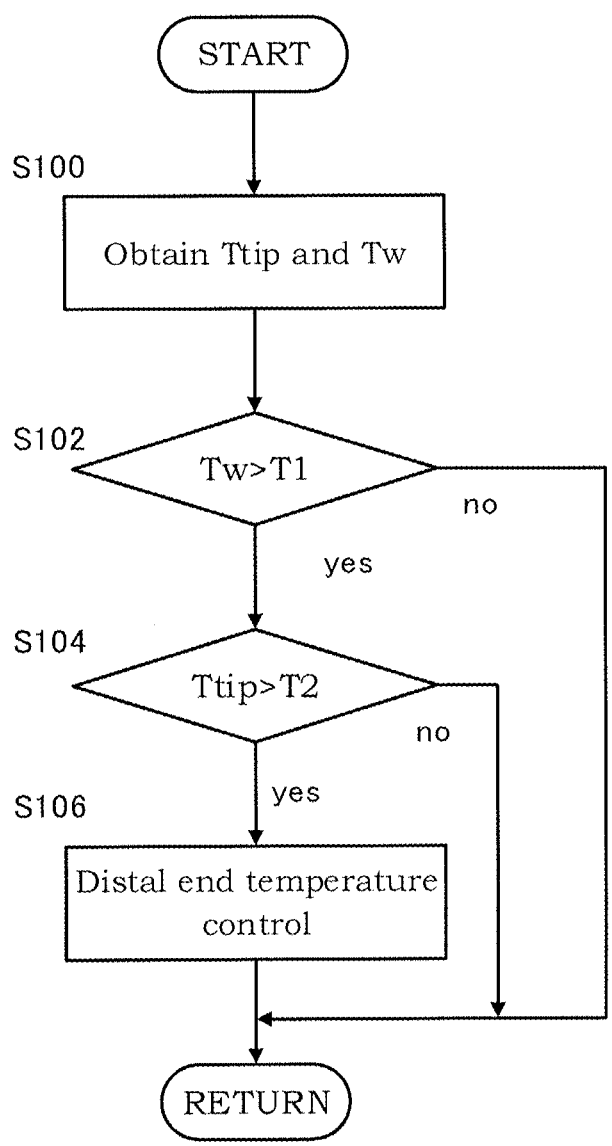
FIG. 7 is a flowchart illustrating a control routine to reduce the PN increase.

FIG. 7 is a flowchart for a control routine determining whether to perform the fuel temperature control mode or not.

At Step S100, the controller 100 obtains an injector distal end temperature Ttip and a coolant temperature Tw. With a temperature sensor to detect the distal end temperature of the injector 5 mounted, the controller 100 reads a detected value by this temperature sensor. With the temperature sensor not mounted to the injector 5, the controller 100 estimates the injector distal end temperature Ttip through an operation described later. The controller 100 reads a detected value by a water temperature sensor also mounted to the general internal combustion engine as the coolant temperature.

Here, the following describes the estimating method of the injector distal end temperature Ttip.

Figure 8:
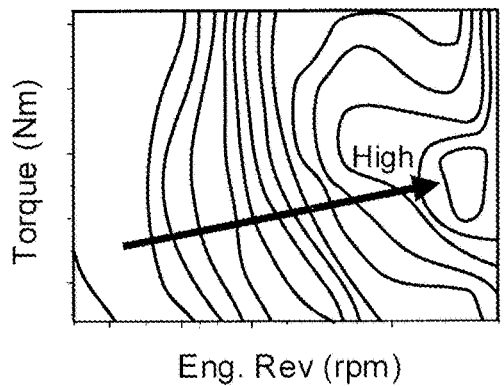
FIG. 8 is an injector distal end temperature map.
Figure 9:
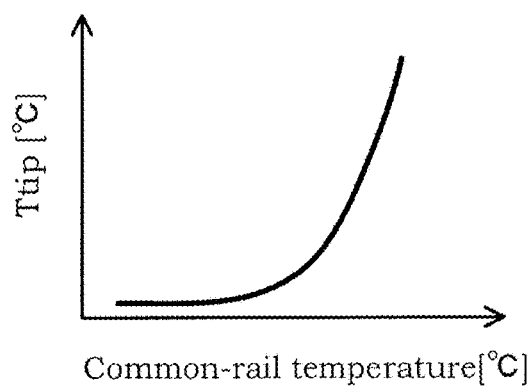
FIG. 9 is a correction coefficient table on the basis of a common-rail temperature.
Figure 10:
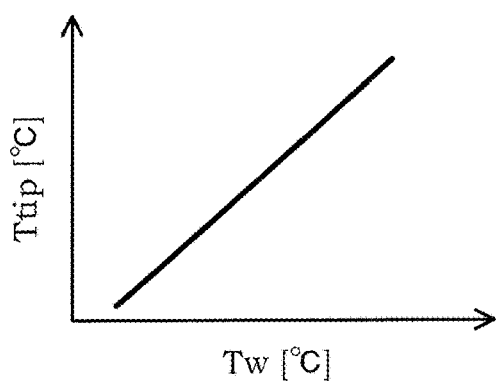
FIG. 10 is a correction coefficient table on the basis of a cooling water temperature.

FIG. 8 is a map illustrating a relationship between an engine load and an engine revolution speed and the injector distal end temperature Ttip. The controller 100 calculates the engine load on the basis of the detected value by an accelerator pedal opening degree sensor (not illustrated) and calculates the engine revolution speed on the basis of the detected value by a crank angle sensor. The controller 100 refers to the map in FIG. 8 to calculate the injector distal end temperature Ttip. For further highly-accurate calculation of the injector distal end temperature Ttip, the injector distal end temperature Ttip calculated from the map in FIG. 8 may be corrected using a correction coefficient on the basis of a common-rail temperature and a correction coefficient on the basis of the coolant temperature. The correction coefficient on the basis of the common-rail temperature is preset on the basis of, for example, a relationship between the common-rail temperature and the injector distal end temperature as illustrated in FIG. 9. Similarly, the correction coefficient on the basis of the coolant temperature is preset on the basis of, for example, a relationship between the coolant temperature and the injector distal end temperature as illustrated in FIG. 10.

When the controller 100 obtains the injector distal end temperature Ttip and the coolant temperature Tw as described above, the controller 100 determines whether the coolant temperature Tw is higher than a predetermined temperature T1 or not at Step S102. The controller 100 performs a process at Step S104 with the determination result of positive and ends the routine at this time with the determination result of negative.

The predetermined temperature T1 is a threshold to determine whether the internal combustion engine 1 is in the warm-up state or not. That is, when the determination result of this step is negative, the internal combustion engine 1 is in a cooling state, and the controller 100 performs the control for the Zero-Flow mode different from this routine.

At Step S104, the controller 100 determines whether the injector distal end temperature Ttip is higher than a predetermined temperature T2 or not. With the determination result of positive, the controller 100 performs a process at Step S106 and with the determination result of negative, the controller 100 ends the routine at this time.

This step is to determine whether the rise of the fuel temperature needs to be reduced or not. In view of this, the temperature lower than a temperature at which the flash boiling of fuel occurs by several ° C. is preset as the predetermined temperature T2. It is only necessary that "the temperature lower by several ° C." is a temperature at which the rise of the fuel temperature up to the temperature at which the flash boiling occurs can be prevented as long as a distal end temperature control described later is started. Specifically, the predetermined temperature T2 is set so as to fit.

At Step S106, the controller 100 performs the fuel temperature control mode. As described later, this embodiment cools the injector 5 to control the fuel temperature; therefore, in the following description, the fuel temperature control mode is referred to as "a distal end temperature control."

The distal end temperature control is a control to reduce the rise of the fuel temperature to avoid the flash boiling. The distal end wet is caused by the flash boiling due to the rise of the fuel temperature as described above. The cause of the rise of the fuel temperature includes the fuel passing through the temperature-raised injector 5 being exposed under the burnt flame and the combustion gas. Accordingly, lowering the temperature of the injector 5, especially the distal end part with the injection hole 5A ensures lowering the fuel temperature. Accordingly, this embodiment controls the temperature of the injector 5 to control the fuel temperature to avoid the flash boiling. Specifically, the control is performed using the second MCV 8 such that a coolant flow rate of the cylinder head 3 is increased to reduce the rise of the fuel temperature and the coolant flow rate is decreased to reduce the decrease of the fuel temperature. This is because, since the injectors 5 are mounted to the cylinder head 3, lowering the temperature of the cylinder head 3 also lowers the temperature of the injectors 5. The coolant flow rate is controlled so as to meet the following conditions.

Firstly, the fuel temperature when the fuel passes through the injection holes 5A is equal to or less than the temperature at which the flash boiling occurs. Secondly, the coolant temperature is equal to or more than a lower limit temperature at which the increase in PN and an increase in oil dilution by the fuel do not occur. Thirdly, the coolant temperature is equal to or less than an upper limit temperature at which the coolant is not boiled.

Representing a lower limit value of a temperature range meeting the above-described conditions by T3 and an upper limit value by T4, a relationship T3<T2<T4 is met.

Figure 11:
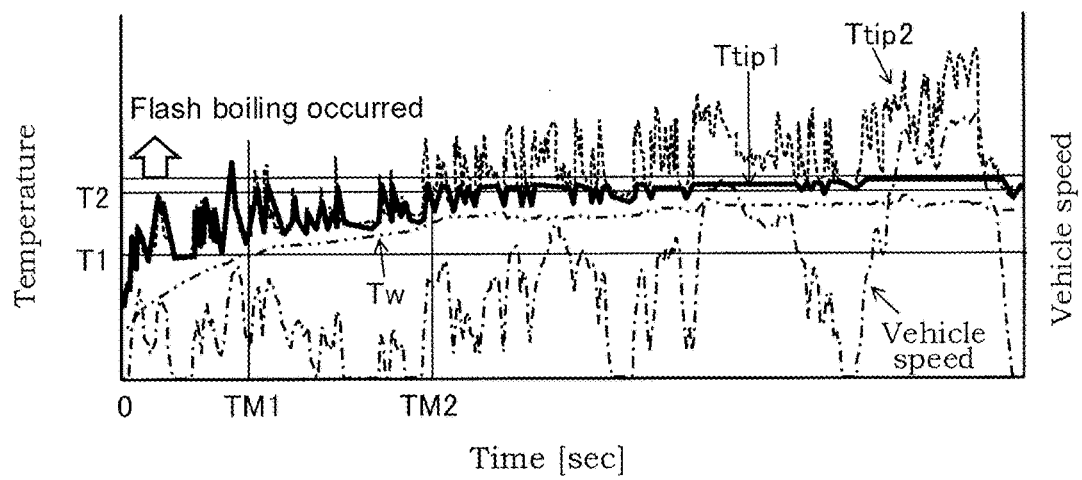
FIG. 11 is a timing chart when a control of the first embodiment is performed.

FIG. 11 is a timing chart when the control routine in FIG. 7 is performed during an operation in a discharged gas test mode. It should be noted that an injector distal end temperature Ttip2 indicated by the dashed line in the drawing is a comparative example. This comparative example illustrates a transit of the injector distal end temperature in the case where the cooling circuits of the cylinder block and the cylinder head are not independent and the control routine in FIG. 7 is not performed.

In association with the operation start, the coolant temperature Tw gradually rises and exceeds the predetermined temperature T1 at a timing TM1. When the injector distal end temperature Ttip 1 exceeds the predetermined temperature T2 at the timing TM2, the controller 100 starts the distal end temperature control. Accordingly, the injector distal end temperature Ttip 1 does not exceed the temperature at which the fuel passing through the injection hole 5A causes the flash boiling. In contrast to this, in the comparative example, the injector distal end temperature Ttip2 rises in association with the elapse of the operating period and the increase in vehicle speed and exceeds the temperature at which the fuel passing through the injection hole 5A causes the flash boiling.

Thus, this embodiment can reduce the flash boiling of the fuel injected by the distal end temperature control.

Figure 12:
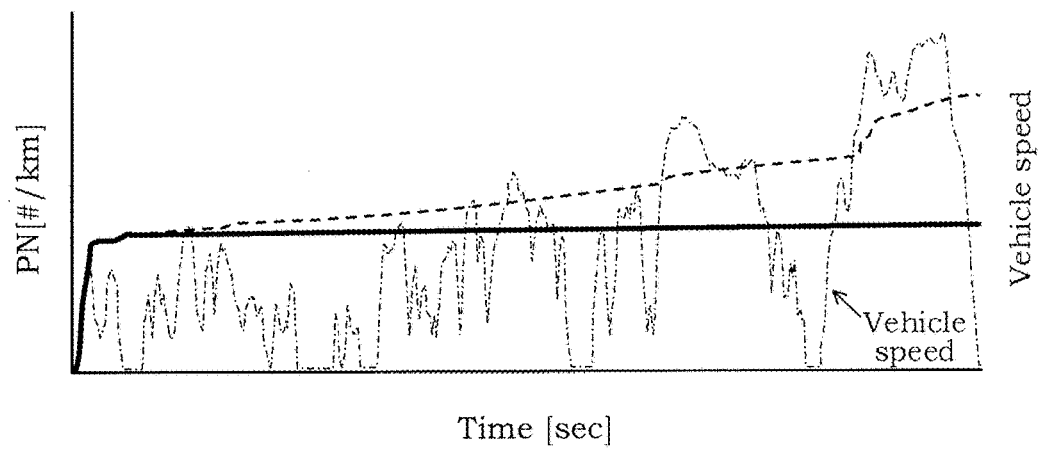
FIG. 12 is a timing chart illustrating a transit of the PN.

FIG. 12 illustrates a transit of the PN during the operation in the discharged gas test mode. The solid line in the drawing indicates an amount of discharged PN of this embodiment and the dashed line is the comparative example similar to FIG. 7. The time axis (the horizontal axis) is common to FIG. 11.

In the comparative example, the PN increase in association with the elapse of the operating period. This corresponds to the behavior of the injector distal end temperature Ttip2 in FIG. 11. In contrast to this, the PN when this embodiment is performed is maintained almost constant after the increase immediately after the operation start. That is, the increase in PN caused by the distal end wet is reduced.

Here, the description is given of the coolant temperature in the block-side passages WB (hereinafter also referred to as "a block liquid temperature") and the coolant temperature in the head-side passages WH (hereinafter also referred to as "a head liquid temperature") in the first mode and the second mode in the radiator flow passage control mode.

Figure 13:
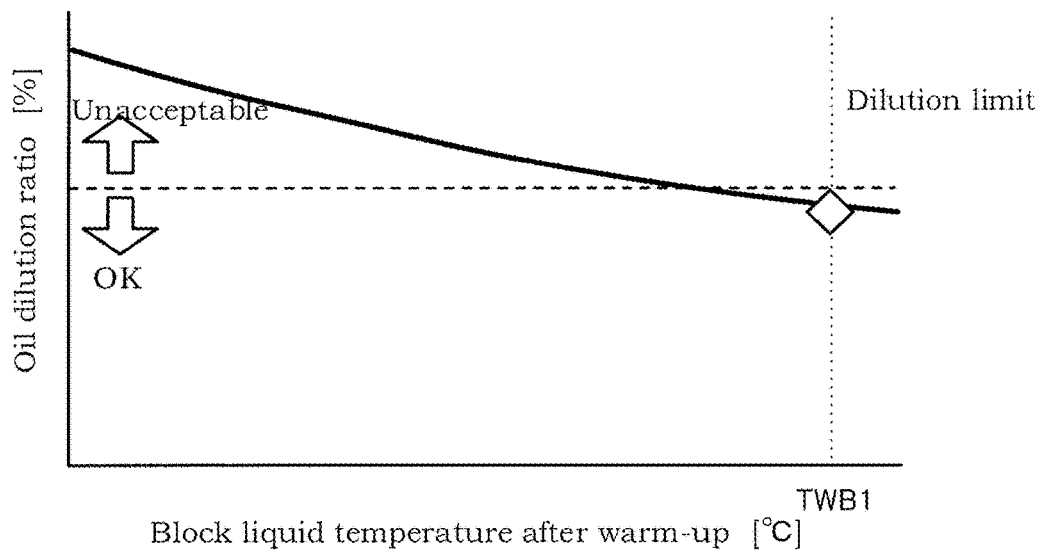
FIG. 13 is a drawing illustrating a relationship between an oil dilution ratio and a coolant temperature in a cylinder block.

FIG. 13 is a drawing illustrating a relationship between the block liquid temperature and the oil dilution ratio after state enters the warm-up state.

The oil dilution where the fuel attached to the cylinder wall or a similar member mixes with engine oil (hereinafter also simply referred to as "oil") possibly occurs during the operation of the internal combustion engine 1. As the oil dilution ratio becomes high, the performance of oil is deteriorated; therefore, it is necessary to provide a dilution limit and not to exceed the dilution limit.

As illustrated in FIG. 13, the oil dilution ratio becomes high as the block liquid temperature lowers. This is because that the lower the block liquid temperature is, the lower the wall temperature of the cylinder block is, and the fuel is likely to attach. Therefore, the block liquid temperature needs to be controlled to a temperature such that the oil dilution ratio does not exceed the dilution limit. It should be noted that a block liquid temperature TWB1 in the drawing is a reference value of the block liquid temperature in FIG. 14 described later.

Figure 14:
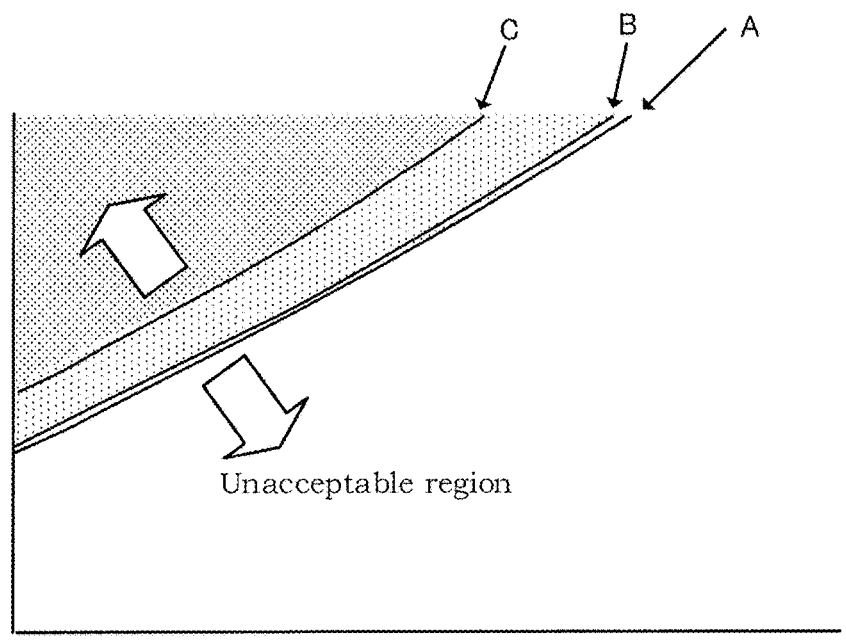
FIG. 14 is a drawing illustrating a relationship between temperatures of the cylinder block and a cylinder head and an amount of discharged HC.

FIG. 14 is a drawing to describe sensitivity of the amount of discharged HC to the block liquid temperature and the head liquid temperature.

The horizontal axis indicates the amount of discharged HC for 15 seconds from the engine start and the vertical axis indicates the exhaust air temperature after 15 seconds from the engine start. The lower side of a curved line A-C is a region (an OK region) in which an amount of discharged HC regulation value can be cleared and the upper side is a region in which the amount of discharged HC regulation value cannot be cleared (an unacceptable region) described later.

The curved line A indicates the relationship between the amount of discharged HC and the exhaust air temperature in the case where the block liquid temperature and the head liquid temperature each have predetermined reference values (TWB1 and TWH1). It should be noted that the reference value TWB1 of the block liquid temperature and the reference value TWH1 of the head liquid temperature have the identical temperature.

A curved line B indicates a relationship between the amount of discharged HC and the exhaust air temperature in the case where only the head liquid temperature is lowered more than the curved line A and is set as TWH2. As illustrated in the drawing, the curved line B hardly changes from the curved line A. That is, only lowering the head liquid temperature hardly changes the OK region.

A curved line C illustrates the relationship between the amount of discharged HC and the exhaust air temperature in the case where the block liquid temperature is lowered more than the curved line B and is set as TWB2. The block liquid temperature of the curved line C is identical to the head liquid temperature. In other words, it can be said that the curved line C is the case of lowering the block liquid temperature and the head liquid temperature from the curved line A. It should be noted that the block liquid temperature TWB2 and the head liquid temperature TWH2 have the identical temperature in the curved line C.

As illustrated in the drawing, the curved line C has the OK region narrower than those of the curved lines A and B.

Accordingly, it can be seen that the amount of discharged HC has high sensitivity to the block liquid temperature and low sensitivity to the head liquid temperature. To avoid the amount of discharged HC to increase, the block liquid temperature is preferably maintained to be the reference value.

The performance required for the operation of the internal combustion engine 1 includes, in addition to the above-described PN request, amount of discharged HC request, and oil dilution request, a combustion stability request, a fuel economy performance request, and an output performance request. These performances also have the relationship with the coolant temperature.

Figure 15:
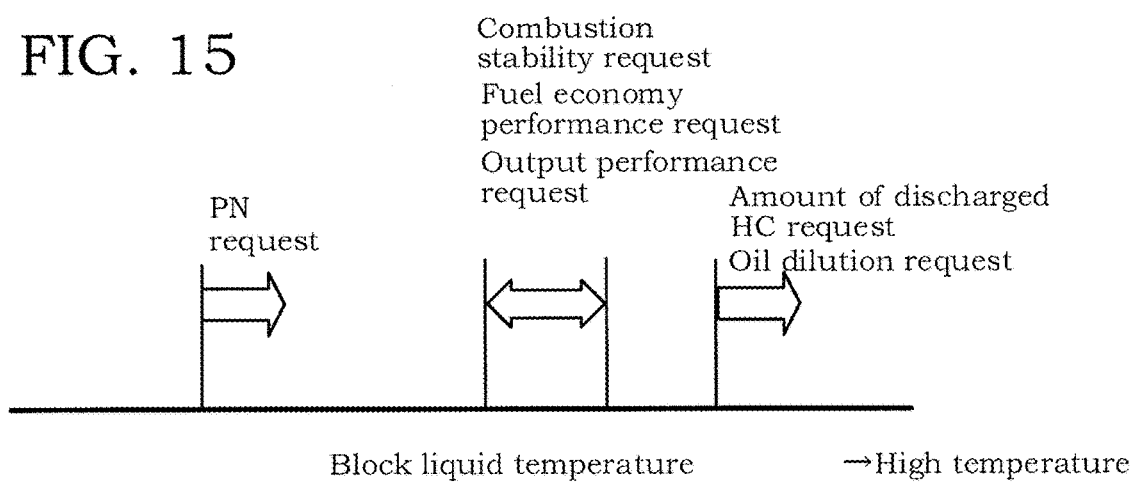
FIG. 15 is a drawing illustrating a relationship between performances required for the internal combustion engine and the coolant temperatures in the cylinder block.

FIG. 15 is a summary of block liquid temperatures meeting the above-described respective requests.

As illustrated in the drawing, compared with the block liquid temperature meeting the amount of discharged HC request and the oil dilution request, the block liquid temperature meeting the combustion stability, the fuel economy performance, and the output performance is low. The block liquid temperature meeting the PN request is further lower than the block liquid temperature meeting the combustion stability and similar performance.

Therefore, the first mode controls the cooling flow passage and the cooling flow rate such that the block liquid temperature maintains the temperature meeting the amount of discharged HC request and the oil dilution request, for example, the above-described TWB1. Regarding the combustion stability request, the fuel economy performance request, and the output performance request, the head liquid temperature may have the temperature identical to the block liquid temperature. Regarding the PN request, the amount of discharged HC request, and the oil dilution request, the sensitivity of the head liquid temperature is small. In view of this, the first mode performs the control such that the head liquid temperature becomes the temperature identical to the block liquid temperature.

On the other hand, the second mode, which is performed in the case of the high load or the high rotation speed, a knocking needs to be avoided. Therefore, while the block liquid temperature is maintained to the temperature identical to the first mode, the head liquid temperature is lowered down to, for example, the above-described TWH2. The reason that only the head liquid temperature is lowered is that the PN request, the amount of discharged HC request, and the oil dilution request can be met as long as the block liquid temperature is not changed.

Figure 16:
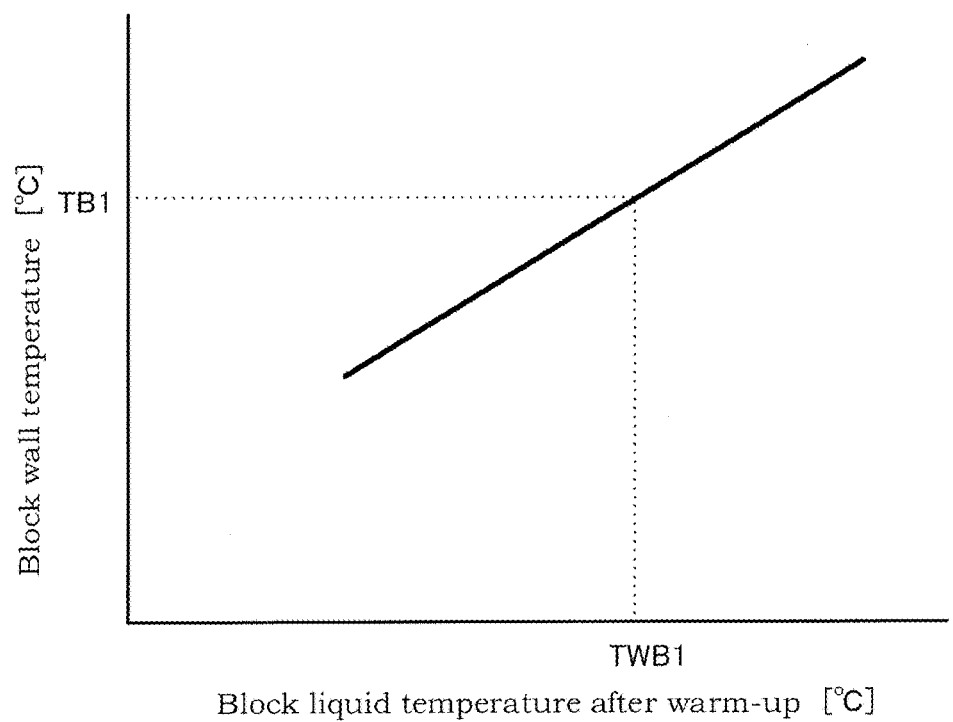
FIG. 16 is a table for conversion of the coolant temperature in the cylinder block into a cylinder block wall temperature.

It should be noted that to control the block liquid temperature and the head liquid temperature, not directly sensing the block liquid temperature and the head liquid temperature but the control on the basis of a block wall temperature and a head wall temperature can also be performed. In this case, it is only necessary to convert the block liquid temperature into the block wall temperature using the table illustrated in FIG. 16. For example, with the block liquid temperature of TWB1, the block wall temperature becomes TB1; therefore, it is only necessary to control the cooling flow passage and the cooling flow rate so as to set the block wall temperature to TB1 while the block wall temperature is monitored. The same applies to the head liquid temperature.

Figure 17:
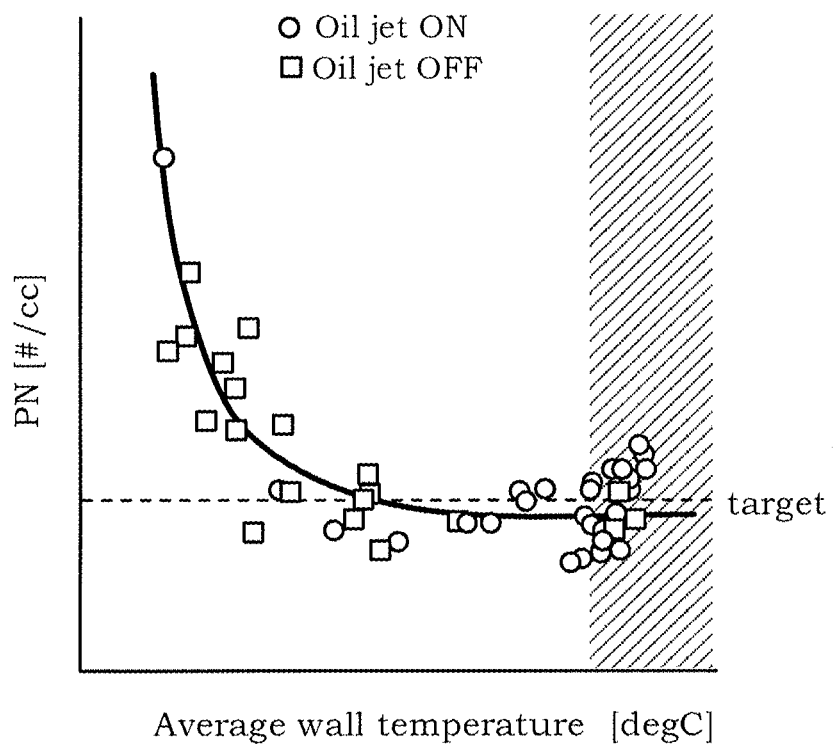
FIG. 17 is a drawing to describe a relationship between an actuation of an oil jet and the PN.

It should be noted that, as illustrated in FIG. 3, the internal combustion engine 1 of this embodiment includes an oil jet 24 for the piston cooling. FIG. 17 illustrates the results of measuring the amount of discharged PN in the case where the oil jet 24 is actuated and not actuated. The "average wall temperature" in the horizontal axis is an average temperature calculated by weighting the block wall temperature and the head wall temperature by predetermined values. The hatched region in the drawing is a temperature region in the case where the control according to the embodiment is performed. The curved line in the drawing is a characteristic line indicative of the relationship between the average wall temperature and the PN created on the basis of the measurement results. The "target" in the drawing indicates the acceptable value of the PN. As illustrated in the drawing, at the aimed wall temperature, the actuation and non-actuation of the oil jet 24 does not have an influence on the PN so much.

Figure 18:
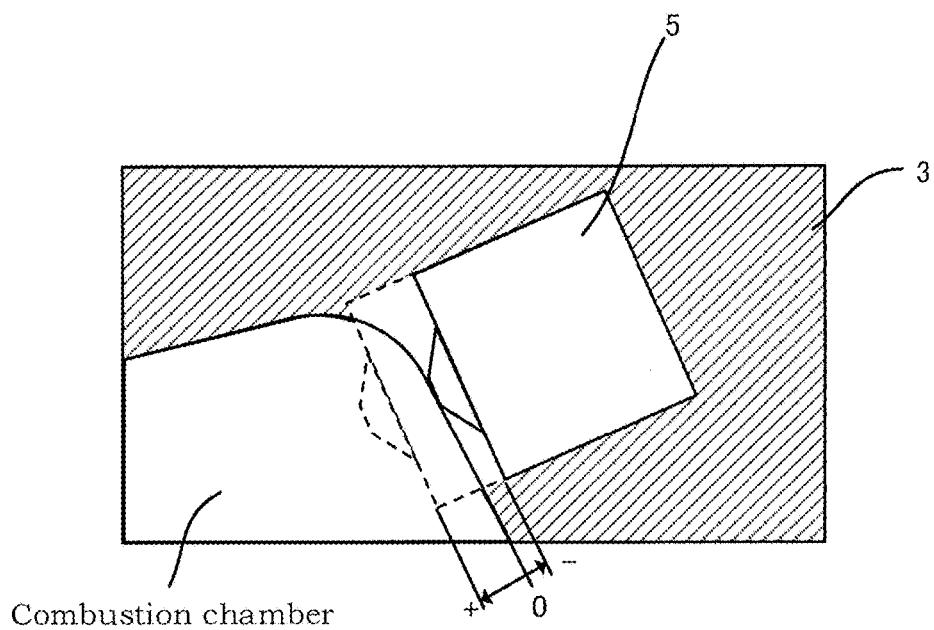
FIG. 18 is a drawing to describe an amount of protrusion of the fuel injection valve.

FIG. 18 is a drawing to describe an amount of protrusion of the injector 5. The distal end of the injector 5 matching the combustion chamber wall surface is determined as an amount of protrusion of zero, the distal end of the injector 5 protruding to the combustion chamber side (the state indicated by the dashed line in the drawing) is determined as the positive amount of protrusion, and the opposite is determined as the negative amount of protrusion.

Figure 19:
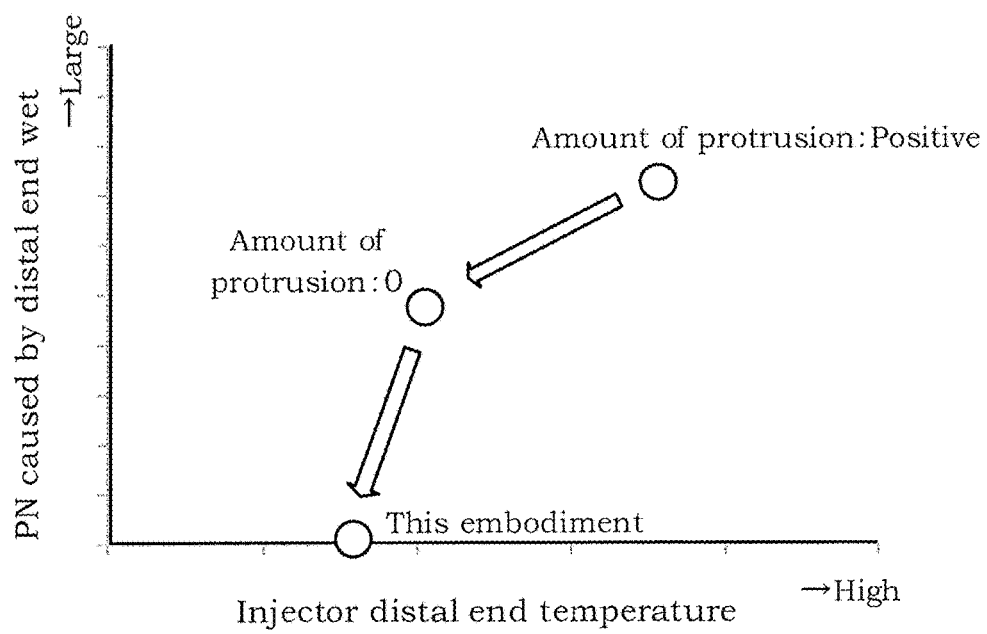
FIG. 19 is a drawing illustrating a relationship between the amount of protrusion and the PN.

FIG. 19 is a drawing illustrating a relationship between the injector distal end temperature and the PN caused by the distal end wet.

The larger the amount of protrusion is, the larger the amount of received heat from the burnt flame and the combustion gas; therefore, the temperature of the injector 5 rises. Consequently, the fuel temperature when the fuel is injected from the injection hole 5A becomes high, increasing the PN. On the other hand, the small amount of protrusion reduces the rise of the fuel temperature, thereby ensuring reducing the increase in PN.

That is, as illustrated in FIG. 19, even when the engine operating state is identical, zeroing the amount of protrusion ensures reducing the PN compared with case of the positive amount of protrusion. The execution of the control of this embodiment with the amount of protrusion being zeroed further enhancing the PN reduction effect.

As described above, this embodiment cools the fuel before the fuel temperature when the fuel passes through the injection hole 5A on the fuel injection valve (the injector 5) reaches the temperature at which the amount of attached fuel to the fuel injection valve distal end increases. This allows reducing the increase in distal end wet, thereby ensuring reducing the increase in PN as the result.

With this embodiment, the internal combustion engine 1 includes the engine cooling passages including the cylinder head cooling passages (the head-side passages WH) and the cylinder block cooling passages (the block-side passages WB) independent of one another and cools the fuel through the control of the coolant flow rate of the cylinder head cooling passages. This ensures reducing the increase in PN caused by the distal end wet without involving the increase in PN due to the fuel attachment to the cylinder block, the increase in amount of discharged HC, the increase in oil dilution ratio, and a similar failure.

This embodiment sets the temperature at which the amount of attached fuel to the distal end of the injector 5 increases as the temperature at which the fuel causes the flash boiling. Since the increase in distal end wet is mainly caused by the flash boiling of the fuel, this embodiment can reliably reduce the increase in distal end wet of the injector 5.

Second Embodiment

Figure 20:
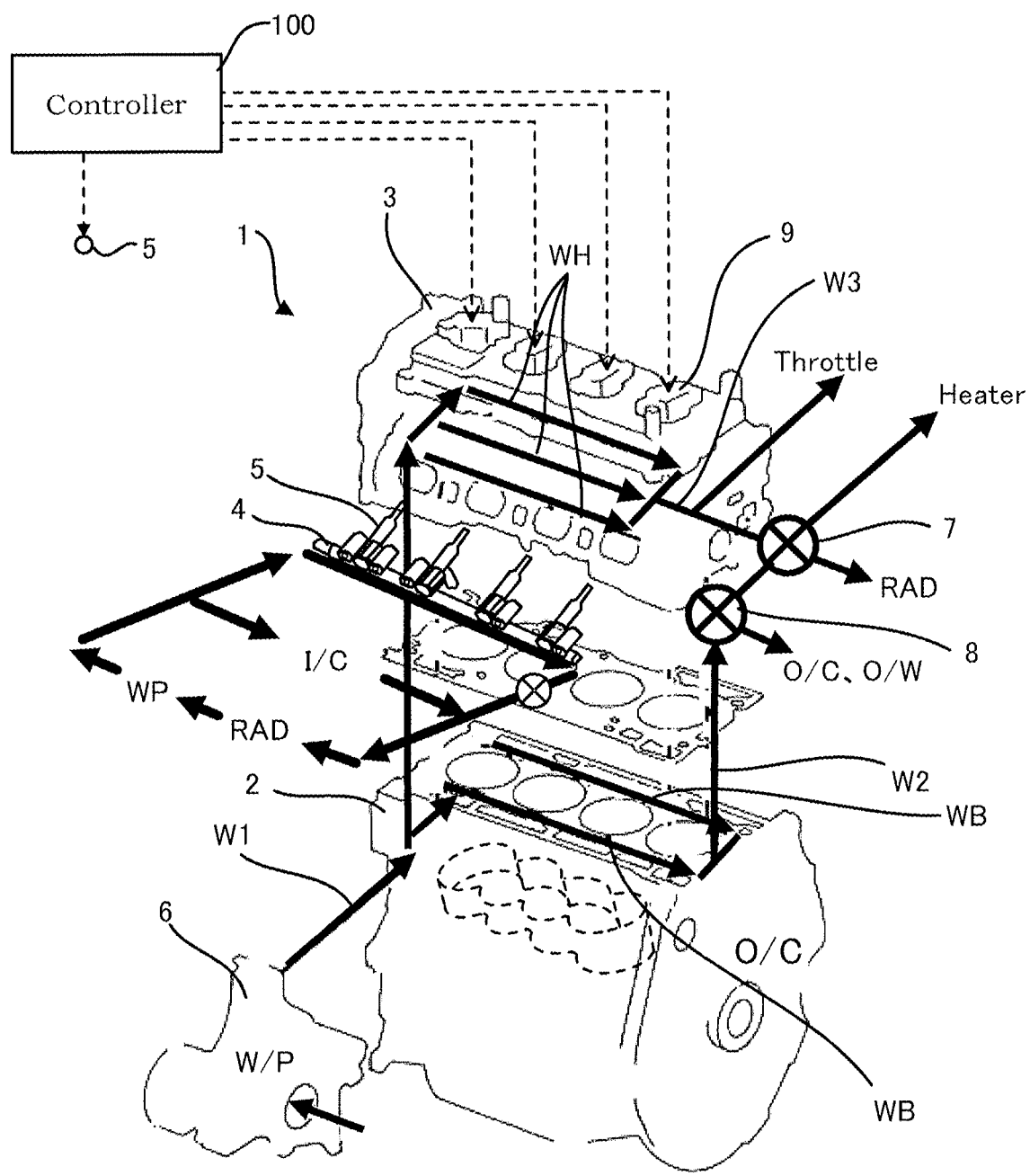
FIG. 20 is a schematic configuration diagram of coolant passages according to a second embodiment.

FIG. 20 is a schematic configuration diagram of coolant passages according to the second embodiment. The configuration of FIG. 20 differs from that in FIG. 1 in that the configuration of FIG. 20 has a cooling circuit to cool the common-rail 4 (a common-rail cooling circuit). The common-rail cooling circuit is different system from the cooling circuit described in the first embodiment and includes a water pump (WP), a radiator (RAD), an intercooler (I/C), and a common-rail coolant passage described later dedicated for this circuit.

Figure 21:
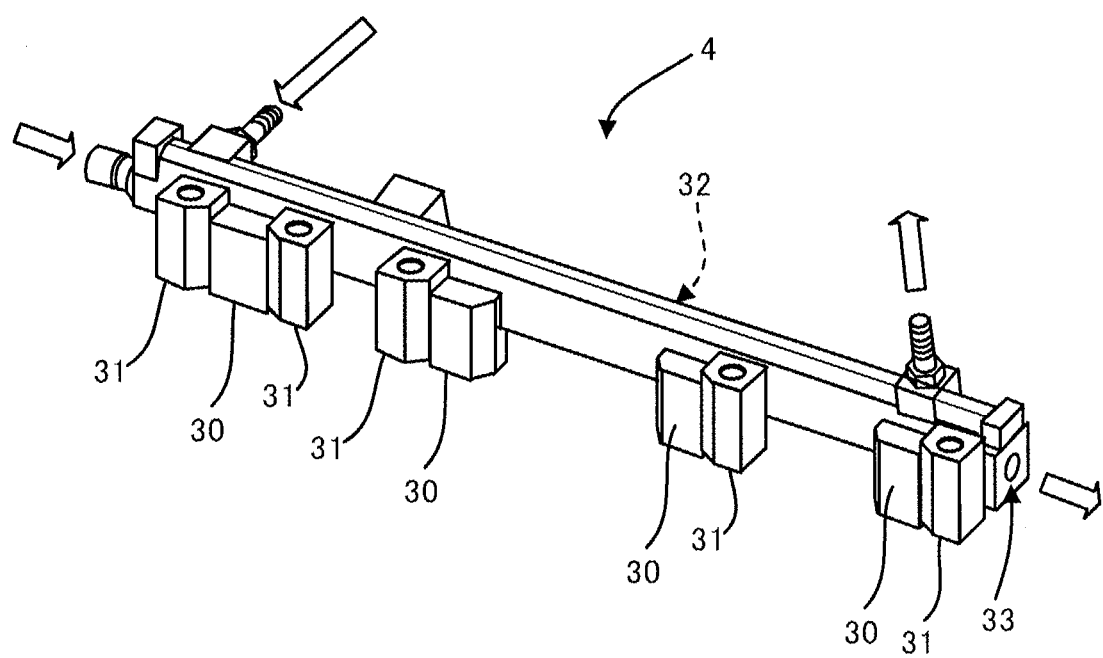
FIG. 21 is a configuration diagram of a common-rail according to the second embodiment.

FIG. 21 is a configuration diagram of the common-rail 4 used for the second embodiment. The common-rail 4 includes injector holders 30 and flanges 31 for bolt fastening. The common-rail 4 includes a fuel passage 33 at the inside and a common-rail coolant passage 32. The common-rail coolant passage 32 is disposed along the fuel passage 33. It should be noted that the arrows in the drawing each indicate flowing directions of the fuel and the coolant.

The fuel sent to the fuel passage 33 of the common-rail 4 by a fuel pump (not illustrated) is injected from the injectors 5 mounted to the injector holders 30. The coolant sent by the water pump dedicated for the common-rail cooling circuit flows through the inside of the common-rail coolant passage 32.

The above-described configuration cools the fuel inside the fuel passage 33 by the coolant flowing through the common-rail coolant passage 32. That is, while the first embodiment cools the injectors 5 to control the fuel temperature, the second embodiment cools the fuel to control the fuel temperature. Such configuration ensures reducing the increase in PN caused by the distal end wet similar to the first embodiment.

The second embodiment can control the fuel temperature independently of the block liquid temperature and the head liquid temperature.

As described above, the second embodiment includes the common-rail 4, which accumulates the pressurized fuel, and the common-rail cooling passage, which includes the circulation circuit separately from the engine cooling passages. Controlling the coolant flow rate of the common-rail cooling passage cools the fuel. This ensures reducing the increase in PN caused by the distal end wet without giving the influence to the block liquid temperature and the head liquid temperature.

The embodiments of the present invention described above are merely illustration of some application examples of the present invention and not of the nature to limit the technical scope of the present invention to the specific constructions of the above embodiments.

The invention claimed is:

1. A control method of direct injection internal combustion engine that directly injects fuel in a cylinder, wherein:
the direct injection internal combustion engine includes an engine cooling passage including a cylinder head cooling passage and a cylinder block cooling passage independent of one another, and
the control method comprises:
performing a fuel temperature control mode that increases a coolant flow rate of the cylinder head cooling passage before a fuel temperature when the fuel passes through an injection hole on a fuel injection valve reaches a temperature at which flash boiling occurs to cool the fuel, the fuel injection valve having a property of the fuel attaching to a peripheral area of the injection hole when the injected fuel causes the flash boiling and an angle of spray of fuel spray increases; and
performing a transition from a radiator flow passage control mode to the fuel temperature control mode when the fuel temperature rises during an execution of the radiator flow passage control mode, the radiator flow passage control mode including a first mode and a second mode, the first mode being configured to control a cylinder block and a cylinder head to have an identical temperature, the second mode being configured to control the cylinder head to have a temperature lower than a temperature of the cylinder block.

2. A control device of direct injection internal combustion engine that directly injects fuel in a cylinder, wherein:
the direct injection internal combustion engine includes:
an engine cooling passage including a cylinder head cooling passage and a cylinder block cooling passage independent of one another;
a fuel injection valve having a property of the fuel attaching to a peripheral area of an injection hole when the injected fuel causes flash boiling and an angle of spray of fuel spray increases;
a temperature obtaining unit configured to obtain a fuel temperature when the fuel is injected from the fuel injection valve;
a fuel cooling unit configured to cool the fuel at a fuel temperature when the fuel passes through the injection hole on the fuel injection valve; and
a control unit configured to control the fuel cooling unit, wherein
the control unit is configured to perform a fuel temperature control mode, the fuel temperature control mode being configured to increase a coolant flow rate of the cylinder head cooling passage before a fuel temperature when the fuel passes through the injection hole on the fuel injection valve reaches a temperature at which the flash boiling occurs to cool the fuel by the fuel cooling unit, the control unit being configured such that when the fuel temperature rises during an execution of a radiator flow passage control mode, the control unit performing a transition from the radiator flow passage control mode to the fuel temperature control mode, the radiator flow passage control mode including a first mode and a second mode, the first mode being configured to control a cylinder block and a cylinder head to have an identical temperature, the second mode being configured to control the cylinder head to have a temperature lower than a temperature of the cylinder block.

* * * * *